June 25, 1963 J. R. MOORE 3,094,787
EXTENSIBLE MEASURING RULE
Filed Nov. 18, 1958 2 Sheets-Sheet 1
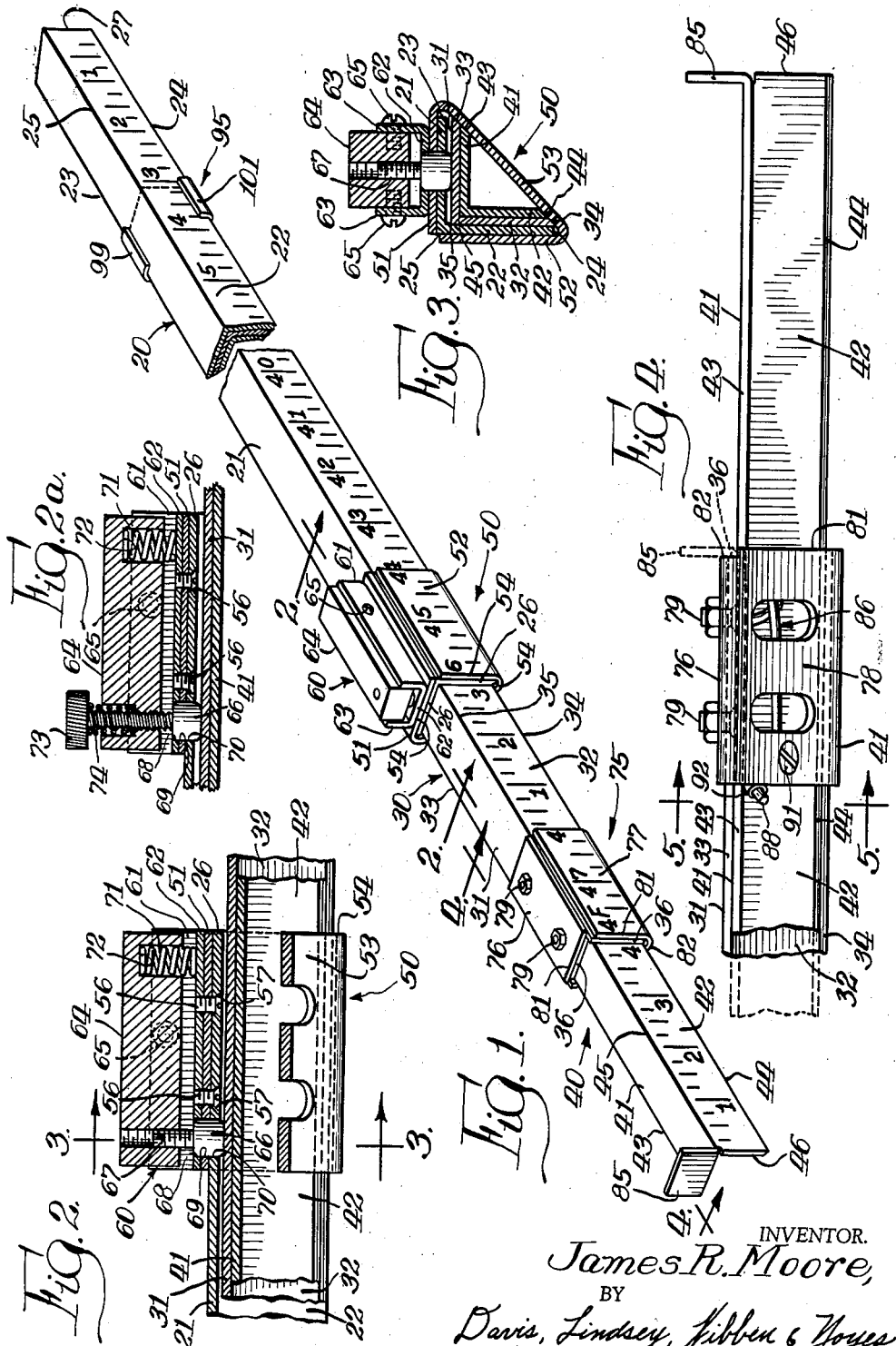
INVENTOR.
James R. Moore,
BY
Davis, Lindsey, Hibben & Noyes
Attys.

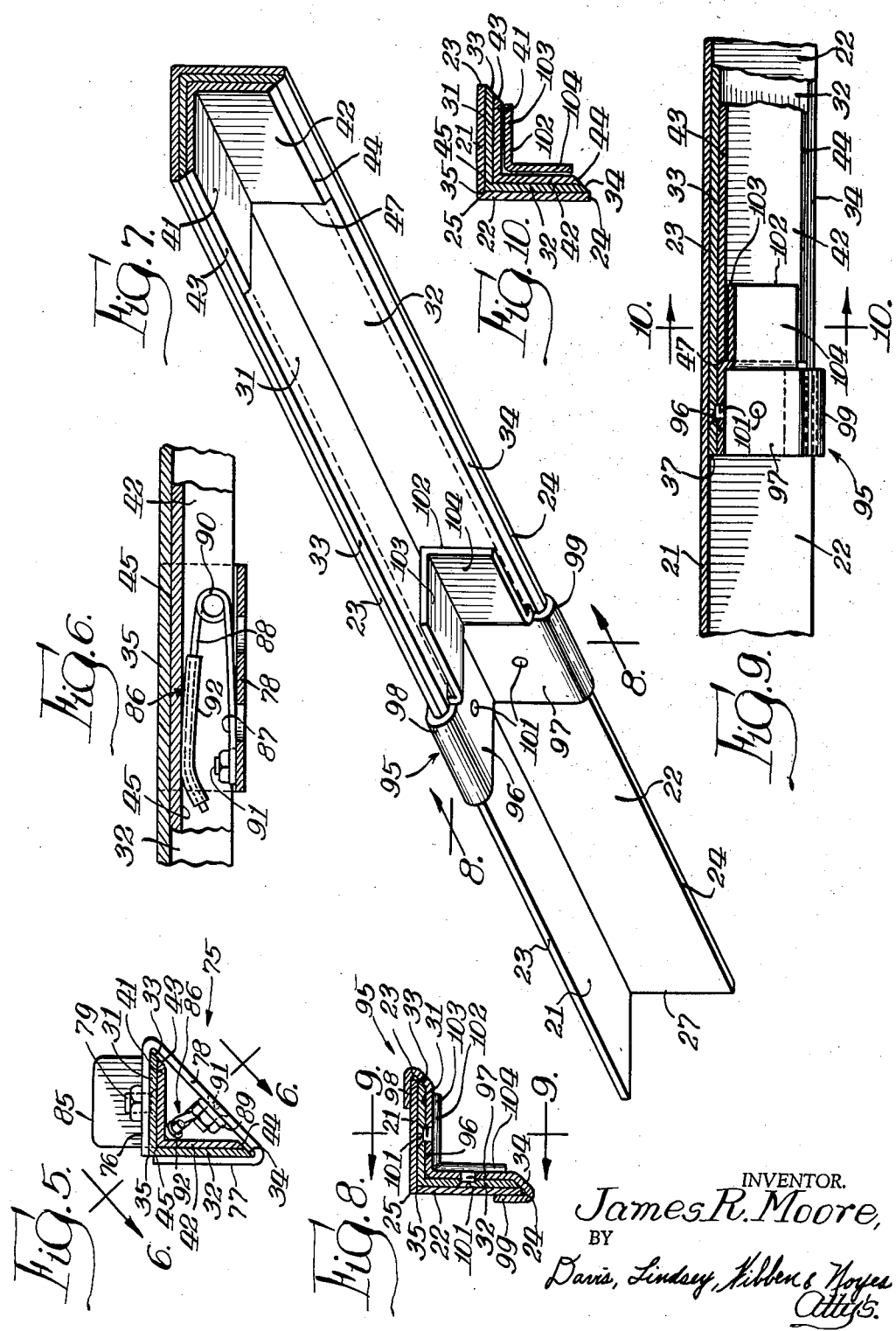

United States Patent Office 3,094,787
Patented June 25, 1963

3,094,787
EXTENSIBLE MEASURING RULE
James R. Moore, P.O. Box 384, Manitowoc, Wis.
Filed Nov. 18, 1958, Ser. No. 774,651
8 Claims. (Cl. 33—161)

This invention relates generally to measuring rules and more particularly to an extensible rule.

The general object of the invention is to provide a novel measuring rule comprising a plurality of nested sections which are angular in cross section and which are maintained in endwise telescoping and sliding relationship by simple, inexpensive and efficient means which may include frictional means for maintaining the sections in a selected extended or telescoped condition.

Another object of the invention is to provide a novel extensible measuring rule made of a plurality of telescoping sections and adapted particularly for use by interior decorators to determine room dimensions, sizes of window and door openings and other measurements needed in decorating and furnishing rooms.

Another object is to provide a novel extensible measuring rule comprising a plurality of telescoping sections, the outer section of which carries a scale marked in inches and feet, and the other sections having similar scales but reversed in direction to show the number of inches or feet to be added to the total length of the outer section.

Other objects of the invention will become apparent as the description proceeds with reference to the accompanying drawings in which:

FIG. 1 is a view in perspective, showing an extensible rule embodying the features of the invention, with the sections partially extended;

FIG. 2 is enlarged sectional view taken along the line 2—2 of FIG. 1;

FIG. 2a is a view, similar to FIG. 2, of a modified construction of a portion of the rule shown in FIG. 2;

FIG. 3 is a sectional view taken along the line 3—3 of FIG. 2;

FIG. 4 is an enlarged elevational view of a portion of the rule shown in FIG. 1 as viewed from the line 4—4 of FIG. 1;

FIG. 5 is a sectional view taken along the line 5—5 of FIG. 4;

FIG. 6 is a sectional view taken along the line 6—6 of FIG. 5;

FIG. 7 is enlarged view in perspective, partly in section, of the right end of FIG. 1 viewed from the back and with the sections partly extended;

FIG. 8 is a sectional view taken along the line 8—8 of FIG. 7;

FIG. 9 is a sectional view along the line 9—9 of FIG. 8; and

FIG. 10 is a sectional view taken along the line 10—10 of FIG. 9.

An extensible measuring rule, according to this invention, comprises a plurality of nested telescoping sections, such as the sections 20, 30, and 40, shown in FIG. 1, the sections being angular in cross section, preferably a right angle, with the width of the two sides of the angle equal. Thus, the section 20 is a first or outer section having two sides 21 and 22 which respectively have outer edges 23 and 24, a common corner edge 25, an inner or sliding end 26 and an outer or terminal end 27. Section 30 is a second or intermediate section, substantially the same as section 20, and has sides 31 and 32, edges 33 and 34, a common corner edge 35, an inner sliding end 36, and an outer terminal end 37. Section 40 is a third or inner section and has sides 41 and 42, edges 43 and 44, a common corner edge 45, an inner sliding end 46, and an outer terminal end 47.

Throughout the specification reference will be made to the sliding ends and terminal ends of the several sections, it being understood that the former designation has reference to the left end of each of the sections as seen in FIG. 1, and that the latter designation refers to the right end of each of the sections.

Since the three sections are angular in cross section, they are nested one within another, the intermediate and inner sections being progressively smaller in cross section so that the edges of all three are flush, as shown in FIGS. 3 and 10.

The intermediate section 30 and inner section 40 are both of substantially the same length, but are longer than the outer section 20. Thus, sections 30 and 40 extend beyond the outer section 20, when the sections are completely telescoped. While FIG. 1 shows the intermediate and inner sections 30 and 40 partly shifted from their completely telescoped position, the right hand or terminal ends of the three sections are aligned when completely telescoped, and the left hand or sliding ends of the intermediate and inner sections 30 and 40 are aligned with each other but extend beyond the outer section 20.

The several sections are provided with means to limit relative movement in one direction to the completely telescoped position, and the intermediate and outer sections are provided with means to hold the sections in nested relation. Thus, a band 50, triangular in cross section and shown in FIGS. 1 to 4, is formed from a rectangular piece of metal and is bent so as to wrap around the sides 21 and 22 of the first section 20. The band 50 thus includes a pair of rectangular sides 51 and 52 overlying the sides 21 and 22, respectively, and a hypotenuse 53 (FIGS. 2 and 3), connecting the sides 51 and 52 and engaging the edges 33 and 34 of the intermediate section 30 to hold it nested within the outer section 20. The band 50 is connected to the sliding end 26 of the first section 20 such that the outer end edges of the band sides 51 and 52, indicated at 54, are flush with the end edges of the sliding end 26 (FIGS. 1–2). The band 50 may be secured to the sliding end 26 of the first section 20 in any desired manner, in this instance by a pair of screws 56 (FIG. 2).

The band 50 also includes frictional means for holding the second or intermediate section 30 in an adjusted position relative to the first or outer section 20. In this instance, the frictional means preferably comprises a manually operable clutch assembly 60 carried on the band side 51. The clutch assembly 60 includes a U-shaped member or channel 61 which is secured at its base or web portion 62 to the side 51 by the screws 56, which are sufficiently long to extend through the section side 21, band side 51 and web portion 52, the latter being appropriately threaded for this purpose. The channel 61 is mounted on the band side 51 with its flanges 63 extending outwardly to provide supports for rockably mounting a rectangularly shaped block 64 therebetween. To this end, the block 64 is pivotally supported by means shown in this instance as a pair of screws 65 which extend through the flanges 63 and into the block 64 on either side.

The clutch 60 also includes a cylindrical plunger or rod 66 which is located under one end of the block 64 adjacent the sliding end of the section 20, and an Allen screw 67 that is threadedly mounted in the block 64 and alined with the plunger 66. The plunger 66 is seated in openings 68, 69, and 70, respectively in the channel web 62, band side 51, and first section side 21, and is biased into engagement with the outer surface of the second section side 31 by a compression spring 71 located at the opposite or inner end of the block member 64. The spring 71 is seated in a bore 72 in the under surface of the block 64 so that its other end bears against the upper surface of the channel web 62.

The block 64 thus acts as a lever to maintain the plunger 66 in rubbing frictional contact with the side 31 thereby to prevent free sliding movement between the sections 20 and 30. It will be apparent that adjustment of the Allen screw 67 is effective to vary the frictional force of the plunger 66 against the section side 31. Adjustment of the screw 67 is also used to level the position of the block 64. When it is desired to shift the section 30 relative to the section 20, the frictional drag of the plunger 66 may be released by manually pivoting the block 64 against the action of the spring 71 until the end of the plunger 66 is disengaged from the upper surface of the side 31. The band 50 is thus effective to maintain a nested, aligned relationship between the sections 20 and 30, with the clutch maintaining an adjusted position therebetween.

In FIG. 2a, an alternate construction of the clutch block 64 is shown, the set screw 67 there being replaced by a thumb screw 73 and lock spring 74. The thumb screw 73 performs the functions of the screw 67 and also may be used to lock the second section 30 against movement relative to the first section 20 by forcing the spring actuated end of the block 64 into tight engagement with the channel web 62.

A second band 75, triangular in cross section, is carried at the slider end 36 of the second section 30 in a manner similar to the band 50. The band 75 is preferably formed from a rectangular piece of metal bent around the section 30 so as to define a pair of side portions 76 and 77 (FIGS. 1 and 5) overlying the sides 31 and 32, respectively, and disposed at a right angle to each other, and a hypotenuse 78 that encloses the longitudinal edges 43—44 of the inner section 40 to hold it nested within the intermediate section 30. The band 75 is secured to the sliding end 36 of the second section 30 in this instance by a pair of screws 79 which extend through the side 31 of the intermediate section and the side 76 of the band 75.

The band 75 is mounted on the sliding end 36 of the intermediate section 30 such that its outer end edges 81 are flush with the end edges of the sliding end 36. The outer end edge 81 of the band side 76 and the underlying end edge of the side 31 are cut back or notched as at 82 to receive an out-turned bent portion or lip 85 at the sliding end 46 of the inner section edge 41 in flush fitting engagement, the lip 85 being provided so that it may be hooked over an edge of an article which is being measured.

The band 75 also includes means for frictionally retaining the sections 30 and 40 in an adjusted position. Such means in this instance comprises a spring 86, having a mounting leg 87 and a friction leg 88 connected to the leg 87 by a number of turns 90, the mounting leg 87 being disposed adjacent the inner surface of the hypotenuse 78 and being formed with a loop 89 at one end whereby it may be secured to the hypotenuse 78 (FIGS. 5 and 6) as by a screw 91. The spring 86 is of the compression type and is arranged so that the friction leg 88 bears against the inner corner of the section 40 at the apex of the angle thereof to maintain the sections 30 and 40 in relative adjusted relation. A tubular plastic sleeve 92 encloses the friction leg 88 and is effective to prevent excessive wear between the parts. The sides 41 and 42 of the section 40 are thus biased into sliding frictional engagement with the inner surfaces of the sides 31 and 32 of section 30 with a sufficient force to prevent accidental sliding movement therebetween.

In order to maintain the remote or terminal ends of the sections 30 and 40 in nested relationship when the rule has been fully telescoped, a clip 95 is provided (FIGS. 7–9). The clip 95 preferably is a right angle section having sides 96 and 97, and lateral edge portions 98 and 99 which wrap around the longitudinal edges 23—24 and 33—34 of the sections 20 and 30 and slidably engage the outer marginal surfaces of the sides 21 and 22. The clip 95 is secured to the inner side of the intermediate section terminal end 37 (FIG. 9), as for example by screws 101 (FIG. 8), so that the clip slides along the section 20 upon movement of the section 30 relative thereto.

The clip 95 also includes an offset trough-like guide portion 102, preferably formed integrally therewith and extending longitudinally inwardly toward the other end of the rule. The offset portion 102 has a pair of sides 103 and 104 disposed at a right angle to each other and respectively spaced from the inner surfaces of the sides 31 and 32 of the intermediate section 30 a distance substantially equal to the thickness of the terminal end of the section sides 41 and 42. Thus, the terminal end 47 of the section 40 will nest under the offset portion 102 and be snugly retained thereby when the section 40 has been fully telescoped into the section 30 (FIGS. 9 and 10).

Thus, the sections 20, 30 and 40 are maintained nested one within another by the bands 50 and 75 at the sliding ends of the sections and the clip 95 at the terminal ends of the sections. Moreover, the bands 50 and 75 serve as abutments to limit telescoping movements of the sections 20, 30 and 40.

For measuring, it will be seen that measuring scales or indicia are affixed on the outer surfaces of the sides 22, 32, and 42, of the several sections and on the sides 52 and 77 of the bands 50 and 75. The scales in this instance are in inches and feet and may be marked or affixed to the sections and bands in any convenient manner. The scale on the section 20 is arranged with its zero or lower end adjacent the terminal end 27. The scale on the section 20 is continued on the sides 52 and 77 of the bands 50 and 75 to provide a full scale length, when the section 30 is fully telescoped within the section 20. The scales on the second and third sections are similarly disposed on the sides 32 and 42 of the sections 30 and 40, but are arranged with their zero at the slider ends 36 and 46 of the sections so that the larger scale values are disposed adjacent the terminal ends of the sections 30 and 40.

As previously mentioned, the sections 30 and 40 are somewhat shorter than the section 20 but can be extended. In addition, the section 40 can be completely removed from its sliding engagement with the sections 30 and 40 to permit its use as a simple rule as no interlocking abutment is provided on its terminal end.

In using the scales shown in the drawings and assuming that the several sections 20, 30, and 40, of the rule have been fully telescoped, measurements up to four feet may be made by using the scale on the section 20 and its extensions on the sides of the bands 50 and 75. When it is desired to measure distances greater than four feet either the section 30 or 40 or both may be extended relative to the section 20 to obtain the desired measurement. Assuming that it is desired to extend the section 30, an operator need only rock the lever 64 against the action of the spring 71 to release the plunger 67. The section 30 may be then extended for any length up to about 42 inches in addition to the four foot length of the section 20, at which point the end edge of the offset portion 102 of the clip 95 engages the edge of the hypotenuse 53 of the band 50. Since the scale on the section 30 extends in the reverse direction from the scale on the section 20, the amount that the section 30 is extended may be read at the point where the sliding end 26 of the section 20 overlies the scale on the section 30, and this amount is added to the four feet of the scale on the section 20 for a total reading of the measurement. If a still greater scale length is needed, the section 40 may be extended from the section 30 to provide an additional scale length of approximately 46 inches before the section 40 becomes disengaged from the section 30, the exposed scale reading of the section 40 being added to that of the scales on the sections 20 and 30.

Thus, with the various sections of the rule positioned as illustrated in FIG. 1, the measurement would be four feet seven inches, this measurement being the sum of the readings on the scales of the sections 30 and 40, exposed beyond the bands 75 and 50 in addition to the four foot length of the section 20, which includes the two inch scale fragments on each of the bands 75 and 50.

From the foregoing, it will be apparent that the measuring rule of the present invention provides a convenient measuring device for use by interior decorators and the like, for determining a wide range of dimensions. The rule employs a novel nested arrangement of right angle sections which are slidably mounted for extended and retracted movements, the sections being maintained in such nested arrangement by a plurality of enclosing bands. In addition the instant measuring rule includes a novel clutch and friction means arrangement for maintaining the several sections in adjusted extended positions.

I claim:

1. An extensible measuring rule comprising outer, intermediate and inner telescoping sections, each section being angular in cross section with the sections nested in one another, said sections being movable longitudinally relative to each other, and a clip angular in cross section and secured to the inner surfaces of the sides of said intermediate section at one end thereof, said clip having outer edge portions extending around and slidably retaining the outer edges of said outer section, and said clip having an offset portion spaced from the sides of said intermediate section for receiving the end of said inner section when said intermediate and inner sections are completely telescoped with respect to each other.

2. An extensible measuring rule comprising, outer, intermediate and inner telescoping sections, each section being angular in cross section with the sections nested within one another, said sections being movable longitudinally relative to each other, said intermediate section having an abutment engageable with the end of said outer section to limit the telescoping movement of said intermediate section into said outer section, said abutment being wrapped around said intermediate and inner sections to hold them in nested relation, said inner section having a portion at one end bent at a right angle thereto and engageable with said abutment to limit the telescoping movement of said inner section into said intermediate section.

3. An extensible measuring rule comprising telescoping first and second sections, said first section having a scale on an outer side thereof, a first band triangular in cross-section extending around and secured to said first section at one end thereof and maintaining said second section in sliding nested relationship to said first section, said second section having a clip rigidly secured thereto and slidably engaging the edges of said first section and leaving said scale exposed, each section being angular in cross-section with said second section nested in said first section, said clip being located at the opposite end of said first section from said first band when the two sections are fully telescoped.

4. An extensible measuring rule comprising outer, intermediate and inner telescoping sections, each section being angular in cross section with the sections nested one within the other, said sections being movable longitudinally relative to each other, a first band triangular in cross section secured to and extending around said outer section and maintaining said intermediate and inner sections in longitudinally movable relationship to said outer section, said first band having a plunger frictionally engaging said intermediate section, and a second band triangular in cross section secured to and surrounding said intermediate section and maintaining said inner section in longitudinally movable relationship to said intermediate section, said second band having a spring frictionally engaging said inner section.

5. A measuring rule or the like having first and second nested relatively slidable sections, a first band secured to said first section and extending around both of said sections for holding them nested and having an opening, said first section having an opening aligned with the opening in said band, a member secured to said band, a spring biased manually operable lever pivoted on said member, a plunger located adjacent one end of said lever and passing through said openings and frictionally bearing on said second section, and a screw threaded into said one end of said lever and engaging said plunger, said screw being adjustable to move said one end away from said second section and thereby force the other end of said lever into engagement with said member to lock said second section to said first section.

6. An extensible measuring rule comprising outer, intermediate and inner telescoping sections, each section being angular in cross section with the sections nested one within the other, said sections being movable longitudinally relative to each other, a first band triangular in cross section secured to and extending around said outer section and maintaining said intermediate and inner sections in longitudinally movable relationship to said outer section, said first band having frictional means engaging said intermediate section, a second band triangular in cross section secured to and surrounding said intermediate section and maintaining said inner section in longitudinally movable relationship to said intermediate section, and frictional means on said second band in the form of a spring having a portion engaging the inner surface of the apex of the angle of said inner section.

7. A measuring rule according to claim 6, in which a piece of wear-resistant material is mounted on the engaging portion of said spring to reduce the wear at the inner surface of the apex of the angle of said inner section.

8. A measuring rule according to claim 7, in which said piece of wear-resistant material comprises a plastic tube surrounding said engaging portion of said spring.

References Cited in the file of this patent

UNITED STATES PATENTS

| | | |
|---|---|---|
| 297,056 | Bellows | Apr. 15, 1884 |
| 450,141 | Cook | Apr. 14, 1891 |
| 648,576 | Taylor | May 1, 1900 |
| 1,282,030 | Benemelis | Oct. 22, 1918 |
| 2,356,544 | Swanson | Aug. 22, 1944 |
| 2,512,042 | Stern | June 20, 1950 |
| 2,628,854 | Gardner | Feb. 17, 1953 |
| 2,775,805 | Sands | Jan. 1, 1957 |

FOREIGN PATENTS

| | | |
|---|---|---|
| 13,617 | Great Britain | June 18, 1903 |